United States Patent Office 2,997,385
Patented Aug. 22, 1961

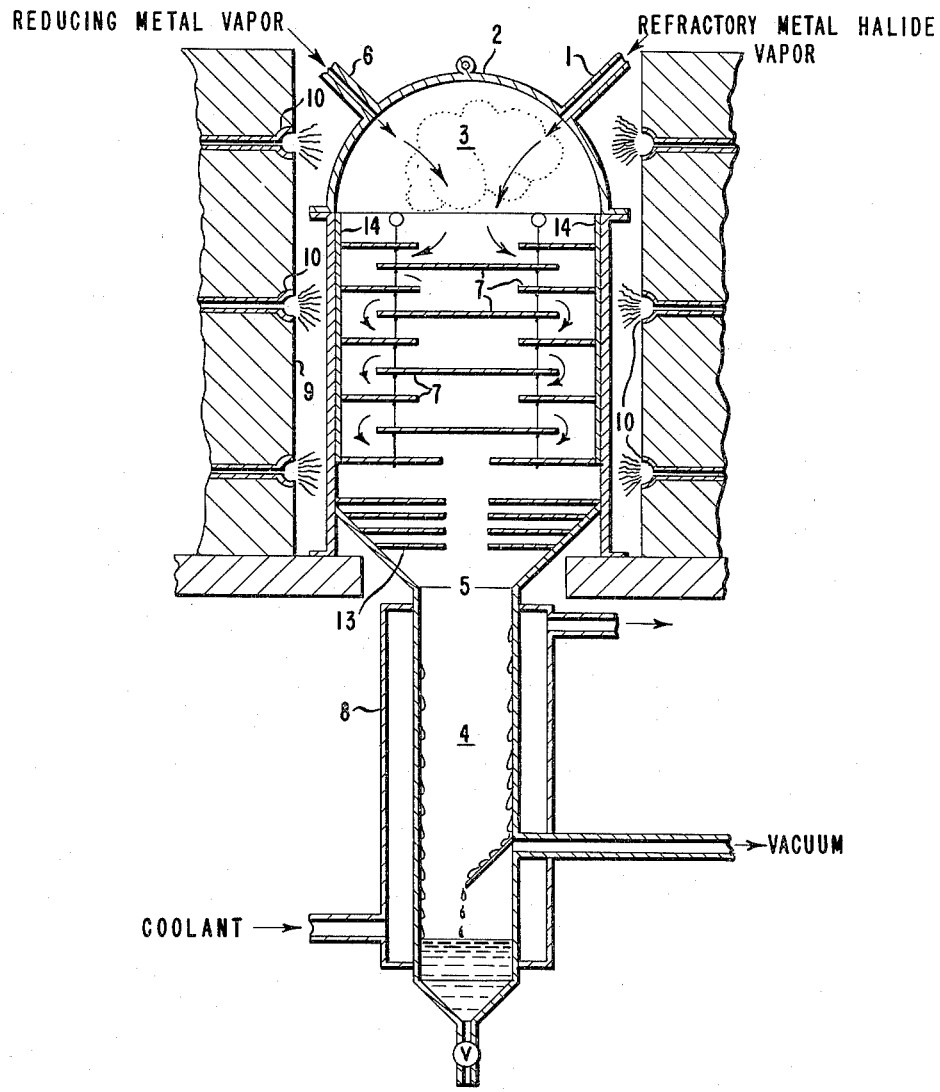

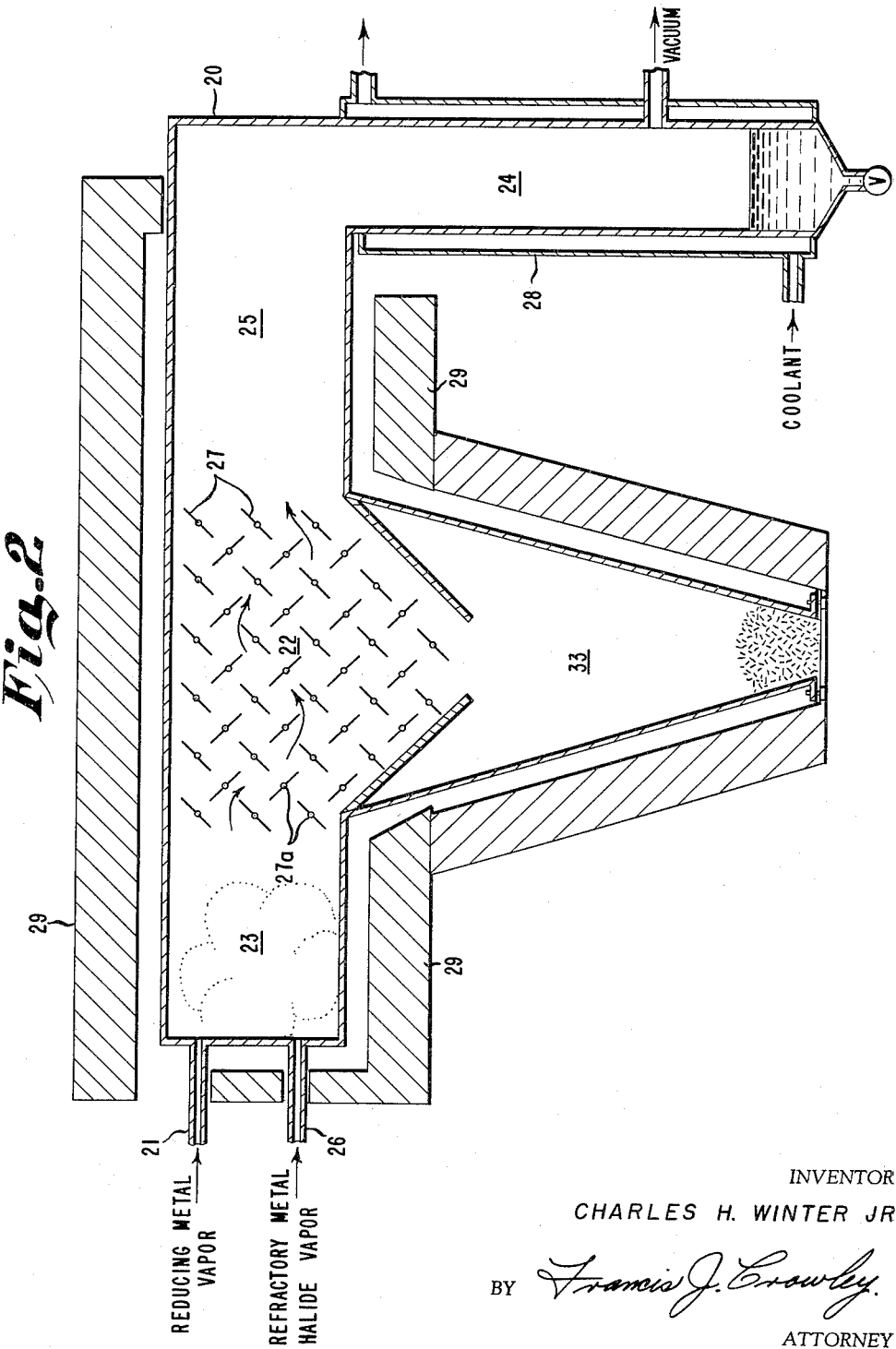

2,997,385
METHOD OF PRODUCING REFRACTORY METAL

Charles Henry Winter, Jr., Wilmington, Del., assignor to E. I. du Pont de Nemours and Company, Wilmington, Del., a corporation of Delaware
Filed Oct. 29, 1958, Ser. No. 770,509
9 Claims. (Cl. 75—84.5)

This invention relates to the production of the refractory metals of the fourth and fifth groups of the periodic table. More particularly, it relates to the production of such metals as titanium, zirconium, hafnium, vanadium, niobium, and tantalum by the reduction of the halides of these metals.

One of the best known methods for producing refractory metals and one which has been used commercially for producing titanium and zirconium is the reduction of a halide of the refractory metal with an alkali metal or an alkaline earth metal. In such a process the reducing metal (e.g., magnesium) is melted in a suitable closed reaction vessel and the refractory metal halide (e.g., titanium tetrachloride or zirconium tetrachloride in the vapor state) is then introduced into the vessel for reaction with the reducing metal. As a result of this procedure, refractory metal is produced in a porous form called sponge, and this product must be subsequently separated from the by-product salts of the reaction and any unconsumed reducing metal. Both of these latter materials, i.e., the by-product salts and reducing metal, are in the liquid state immediately after reaction, and they are removed to as great an extent as possible through a tap hole in the bottom of the reactor. After tapping, more of the contaminants are removed by subjecting the metal sponge to vacuum distillation, or conventional leaching which is followed by a final treatment involving the volatilization and removal of more of the impurities. These procedures, although involving a relatively simple reaction, require special equipment and conditions. For example, it has been considered essential to the process that an inert rare gas atmosphere, such as an argon or helium atmosphere, be consistently maintained during the reduction reaction and while the sponge metal reaction product remains at elevated temperatures.

It is an object of this invention to provide a more simplified procedure for producing high-purity refractory metals by the reduction of a refractory metal halide with an alkali metal or alkaline earth metal reducing agent. More specifically, it is an object of this invention to provide a process which does not require an atmosphere of an inert gas in the reaction chamber during reaction. It is also an object to provide a procedure for producing refractory metals wherein the by-product salts and unreacted reducing metal are separated from the sponge during the reduction reaction. It is another object of this invention to provide a method for producing refractory metal in a form which is particularly suited for powder metallurgy techniques.

The objects of this invention are accomplished by a process for producing a high-purity refractory metal selected from the group consisting of titanium, zirconium, hafnium, vanadium, niobium, and tantalum. This process comprises introducing a vaporous mixture of the refractory metal halide and a reducing metal into a reaction zone containing baffles. The reaction zone is maintained at subatmospheric pressures and at a temperature which is below the melting point of the refractory metal and above the condensation temperature of the halide of the reducing metal. The vaporous mixture is passed along a tortuous path within the reaction zone which is created by the baffles. During passage along this tortuous path, the refractory metal halide in the vaporous mixture is reduced by the reducing metal and refractory metal is deposited in the reaction zone on the surfaces which define the tortuous path. Unconsumed reactants and by-product salts pass through the reaction zone and into a condensing zone which is maintained under subatmospheric pressure and at a temperature below the condensation temperature of both by-product salt and unreacted reactants at the existing pressure of this condensing zone. The by-product salt and unreacted reactants condense almost immediately upon their entrance into the condensing zone, and they may be collected therefrom. The refractory metal can be removed from the surfaces of the reaction zone after the reaction is complete, or alternatively the baffles may be movable so that the deposited metal may be shaken from the baffles during reaction.

In general, the vaporous reactants are introduced into the reaction zone at pressures preferably in the range of from .010 to 300 mm. This zone is maintained in the temperature range of from about 750° C. to 1200° C. Higher temperatures may be used, nearly up to the melting point of the refractory metal product, but problems with materials of construction, such as corrosion and alloying with the product, make temperatures below about 1200° C. more practical. The temperature is controlled through regulation of the feed temperatures, so long as the vapor state is maintained, and by regulation of the heat of the furnace enclosing the reaction vessel. If desired, when operating in the high temperature ranges, special cooling of the baffles may be employed to prevent alloying or contamination of the product in contact therewith. To accomplish this, cooling of the external metal members of the apparatus may be used, thus relying on thermal conduction of the metal to remove heat. Alternatively, the baffles may be made hollow and cooled to the desired reaction temperature by means of circulating heat transfer fluids. In some cases, where the heat of reaction is low and there is a possibility of non-reactivity between the reactants if further heat is not supplied, the reaction may be promoted by increasing the temperature of the incoming reactant vapors. Circulation of heating fluid in hollow baffles is another satisfactory method of supplying the necessary heat for the reaction.

In a specific and preferred embodiment, the invention comprises reacting in the vapor state and at temperatures ranging from 750° C. to 1200° C. titanium tetrachloride or zirconium tetrachloride and magnesium, effecting said reaction in a closed reactor maintained under subatmospheric pressure of from about .25 to 175 mm. mercury, removing by-product vaporized magnesium chloride as formed from the reaction zone into an associated condensing zone which is maintained in open communication with the reaction zone and recovering the titanium or zirconium metal which forms and deposits in said reaction zone.

FIG. 1 is an elevation of one type of apparatus which may be used to carry out the process of this invention.

FIG. 2 is an elevation of still another type of apparatus for carrying out the process of this invention.

Referring now to FIG. 1, there is shown an upright, contaminant-free reaction vessel 2 having an inlet 1 for the introduction of refractory metal halide vapor and another inlet 6 for the introduction of reducing metal vapor. This reaction vessel can be composed of a corrosion-resistant metal alloy or other suitable material, and it is bizonal in character in that it is provided with a suitable reaction zone 3 (which is heated by gas jets 10 in furnace 9) and a condensing zone 4 (which is cooled by a cooling fluid circulated in jacket 8). The vapor outlet 5 of the reaction zone is in open communication with the condensing zone. Subatmospheric pressures (e.g., .010–300 mm. mercury) are maintained in the vessel by means of a vacuum pump (not shown) which is in communication with the condensing zone. The portion of reactor 2 in which reaction zone 3 is situated is usually heated to 750° C.–1200° C. (preferably below about 1000° C.) and above the boiling point of the by-product salt at the pressure involved. This reaction zone contains a removable liner 14 and within this liner are baffles 7 which may be metal sheets positioned at an angle to the overall direction of flow of the reactants. The reaction zone is so arranged as to provide space for the reactant vapors to mix prior to contact with baffles 7. These baffles are set at a sharp angle, e.g. 90°, to the path of flow so as to provide a tortuous path of travel for the reactant vapors as they pass through the reaction zone. During this tortuous path of travel, the vapors contact the baffles and deposit refractory metal thereon due to the reduction of the metal halide by the reducing metal. The temperature in the reaction zone is higher than the condensation temperature of by-product salt at the existing pressure so that the by-product salt is vaporous. This salt and any unreacted reactants continue to travel through the reaction zone, then through the openings in heat reflectors 13, and into condensing zone 4, where substantially all of these vapors are condensed (and, if desired, solidified) and collected. The walls of the condensing zone are cooled by means of a suitable water jacket 8 or other cooling means to temperatures which range from the condensation temperature of the salt to room temperature. If desired, a second condensing zone can be inserted between condensing zone 4 and the vacuum pump (which is not shown) to trap any vapors escaping from the first condenser. Reduction of the refractory metal halide within the reaction zone is continued until the metal product builds up on the baffle plates to a point where practical amounts of metal can be recovered. Sometimes, especially in a batch operation, the passage of the vaporous mixture may be continued until the channels between the baffles become constricted by the metal product build-up. When such deposition of metal has proceeded to a point where the vapor flow is objectionably impeded, the product is removed from the reaction zone for recovery. This removal may take place at elevated temperature under protective atmosphere or, preferably, the batch is cooled and then removed. If the reactor contains a liner as is shown in the drawing, this liner can be removed from the reactor and then the liner and the metal can be separated by conventional means such as stripping the liner from the metal. If the reactor does not contain a liner, the baffle plates may be removed and the refractory metal separated from the walls of the reactor and the baffle plates by chipping, scraping, or other suitable means for separating the refractory metal from its deposition site.

As previously mentioned, FIG. 2 is illustrative of another apparatus which may be used to carry out the process of this invention. In this second figure the reactor 20 contains a horizontal reaction zone 22, which is mounted within furnace 29, and an upright condensing zone 24 which is cooled by water jackets 28. This reactor 20 is maintained at subatmospheric pressure by means of a vacuum pump which communicates with the system through the walls of condenser 24, as shown in the figure. Reducing metal vapor is introduced into mixing space 23 via conduit 21 and refractory metal halide vapor is introduced into this mixing space through conduit 26. After the reactant vapors are mixed in space 23, they pass immediately to reaction zone 22 whereupon the refractory metal halide is reduced and the refractory metals are deposited on the baffles 27. These baffles are each mounted on rods or shafts 27a which in turn are mounted in rotating vacuum-tight seals at the walls of the reaction zone. Such an arrangement makes it possible to rotate, oscillate, or vibrate the baffles so as to shake the deposited metal into hopper 33 which is situated directly below the reaction zone. Alternatively, the baffle shafts may be loosely mounted and sealed with flexible metal sleeves, and the baffles vibrated to loosen deposited metal by striking the ends of the shafts with a hammer. The baffles may be solid rectangular strips of metal substantially filling the cross-section of a rectangular reactor tube. If they are arranged in a meshing fashion (e.g., like furnace grates or some type of comb-like structure), they tend to remove metal from each other when rotated or moved and thus the reaction path is kept open. The vaporous by-products and unreacted reducing metal vapors pass through zone 25 to condensing zone 24, whereupon substantially all of these vapors are condensed and collected. If desired, the process can be made continuous by having suitable chambers or locks attached to the bottom of bin 33 so that metal may be withdrawn while the system is in operation.

For a clearer understanding of the invention, the following specific examples are given. These examples are intended to be merely illustrative of the invention and not in limitation thereof.

*Example I*

The apparatus used was constructed entirely of mild steel, and it consisted of four main sections which were as follows: (1) a magnesium boiler from which magnesium was vaporized into the reactor; (2) a zirconium tetrachloride sublimer in which zirconium tetrachloride was sublimed and passed to the reactor; (3) the reactor itself was a 4-ft. section of 10-in. pipe containing a 16-gauge liner with baffles in staggered arrangement and heat reflectors of the type shown in FIG. 1; (4) the condenser which was a 2-x-2-foot water-cooled cylinder having capacity to handle all the by-product magnesium chloride and unreacted magnesium. The four components of the apparatus were welded together to form a single unit. There were three ports in the apparatus—one was above the magnesium boiler; another was above the zirconium tetrachloride sublimer; and a third was on the exit end of the condenser. These ports were closed by bolted flanges, the seal being made with gaskets in a tongue and groove assembly. All seals were maintained at approximately room temperature by water cooling. Evacuation of the system was effected by means of a mechanical pump capable of producing a vacuum of 10 microns. The connection to the apparatus was made through the head plate on the condenser, and the pump was protected by a Dry Ice trap. The apparatus was equipped with valved fittings for connecting a pressure gauge and also a vacuum gauge. There were also connections for admitting tank hydrogen and argon to the system. The furnacing means was constructed of insulating firebrick and heat was furnished by means of gas which was metered to individual burners by diaphragm gauges.

In order to insure optimum functioning of the apparatus, it was most important that the rate of influx of the reactants to the reactor be closely controlled. It was also necessary to maintain the reactor below 925° C. to prevent alloying of zirconium with the iron liner and baffles. It was likewise important to conduct the reaction with some magnesium excess to eliminate the possibility of forming lower chlorides of zirconium since these lower chlorides would contaminate the metal product, and they also constitute a fire hazard when moist air is present. The pressure in the condenser was maintained below 1 mm., but the pressure within the reactor was higher because of the resistance to the gas flow by the baffles.

The metering system consisted primarily of sharp-edged, accurately machined orifices mounted in each of the lead-in pipes for the reactants. The two rates of flow were determined by the size of the orifices drilled to the pre-determined size, and the pressure differentials across them. The downstream pressure was taken as the pressure in the cold end of the reactor which could be measured by a vacuum type mercury manometer. The slightly higher pressure in the reaction zone (the effective down-stream pressure) did not cause appreciable error in the feed stoichiometry since it was the same for each reactant. The upstream pressure in each case was controlled at a pre-determined calculated value, based on orifice characteristics, by heating each vaporizer to the temperature known to give the desired vapor pressure of the contained reactant. In this way, flow rates were controlled without use of valves which are practically impossible to operate without leaks at these temperatures in view of the corrosive conditions.

The sublimer was loaded with 151 pounds of untreated zirconium tetrachloride, and the neck of the sublimer was tightly packed with glass wool to minimize dusting during pump-down and out-gassing. 78¼ pounds of magnesium were placed in the boiler. The loading ports on the vessels containing the reactants were then sealed gas-tight.

Since the zirconium tetrachloride contained $FeCl_3$, $SiCl_4$, and $TiCl_4$, together with smaller amounts of other volatile impurities, a purification of the $ZrCl_4$ was effected prior to the reduction reaction. The apparatus was slowly evacuated and maintained under vacuum. It was then filled with hydrogen at about 4 lbs. gauge pressure and the zirconium tetrachloride sublimer was slowly heated to 300° C. (5 hours) with a hydrogen flow of approximately 5 cu. ft. per hour. At this temperature and pressure, $ZrCl_4$ does not sublime, but the $FeCl_3$ is reduced to non-volatile $FeCl_2$. After cooling to 85° C. the furnace was evacuated to remove $H_2$ and HCl, and most of the volatile impurities.

After these preliminaries, the reduction step was undertaken. After pumping down the apparatus, the magnesium boiler, zirconium tetrachloride, and reactor furnaces were simultaneously heated. It took about 5 hours to get these elements of the apparatus to operating temperature. When this was accomplished, the reaction began. Operating temperatures were maintained by control of furnace heat and circulation of cooling air on the walls of the reactor when it appeared that the operating temperatures might be exceeded. The operating temperatures range was 805° C.–920° C. (805° C. being the minimum temperature at the cold end and 920° C. the maximum temperature at the inlet end). Average rate of formation of zirconium was 2.8 pounds per hour, and the maximum rate of formation was 7.25 pounds per hour. The actual running time at operating temperature was 9⅓ hours, and the reactor was maintained at 805° C.–920° C. during the entire run.

After cooling under argon, the reactor was opened by removing the head plate on the condenser. The condenser contained some pyrophoric zirconium dust along with condensed magnesium and magnesium chloride. Over 75% of the zirconium was deposited within the liner. Some of the zirconium had formed crystalline metal on the baffles, but it was also present in the form of a spongy mass.

A sample of the crystalline metal on being spectrographically analyzed showed:

|     | P.p.m. |
| --- | --- |
| Al  | Less than 75 |
| Ca  | do---- 10 |
| Cr  | do---- 10 |
| Cu  | do---- 10 |
| Fe  | 240 |
| Mg  | 20 |
| Mn  | 15 |
| Ni  | Less than 25 |
| Pb  | do---- 15 |
| Si  | do---- 35 |
| Sn  | 15 |
| Ti  | 70 |
| V   | Less than 100 |

A typical "hot-wire" process zirconium product has the following analysis (U.S. Atomic Energy Commission publication AECD–2726, page 9, table 2):

Iodide Process Zr:
| | |
| --- | --- |
| Al | 100–200 p.p.m. |
| Ca | 50–100 p.p.m. |
| Cu | present |
| Fe | 50–2100 p.p.m. |
| Mg | 50–3000 p.p.m. |
| Ni | present to 21 p.p.m. |
| Si | 100–800 p.p.m. |
| Ti | 1–50 p.p.m. |

This comparison clearly shows the high purity product which the method of this invention readily provides.

*Example II*

Titanium metal was produced in a modified form of the apparatus utilized in Example I. The modification dealt with the means for supplying the metal halide vapor to the reactor. Since titanium tetrachloride is a liquid, the metal halide vaporizing system was changed to allow the titanium tetrachloride to be metered as a liquid into a boiler which flash-vaporized it for introduction into the reactor. The remainder of the apparatus and auxiliaries were the same as utilized in Example I. The titanium tetrachloride utilized in this reduction was of high purity and therefore it did not require pretreatment prior to use. The rate of titanium tetrachloride addition was controlled by a valve and the amount determined by a liquid metering means.

The titanium tetrachloride supply tank was filled with about 100 lbs. of titanium tetrachloride. The valve in the line leading from the supply tank to the flash vaporizer was closed during the time the reaction equipment was prepared for the start of the reduction process. About 30 lbs. of magnesium was placed in the boiler, and the system was then connected and tested for gas tightness. During the pumping-down operation, the magnesium boiler, the titanium tetrachloride vaporizer, and the reactor furnaces were simultaneously heated. Upon the reactors being at temperature (about 800° C.–900° C.), the reaction was carried on for five hours. During this five-hour operating period, the magnesium was fed at a rate of about 5.5 lbs. per hour, with the titanium tetrachloride being metered in at about 19 lbs. per hour. The reaction zone was maintained at about 850° C. during the reaction period by controlling furnace heat and circulating cooling air on the walls of the reactor when necessary. The pressure during this period in the vacuum line adjacent to the condensing zone varied from 10 to 200 microns. Average rate of formation of titanium was slightly less than five pounds per hour.

After cooling under argon, the reactor was opened by removing the head plate on the condenser. About 75% (18 lbs.) of the titanium was found in the heated zone of the reactor in the form of crystals. A four-pound mass of titanium in spongy form containing $MgCl_2$ was attached to the shields which were used to prevent loss of radiant heat from the rear end of the reaction zone. The magnesium chloride by-product salt recovered from this reaction contained about 95 lbs. of magnesium chloride, 3.5 lbs. of magnesium, and about 2 lbs. of titanium metal in a fine form which had been blown into the collection vessel.

A sample of the crystalline metal on being analyzed showed:

| Ti | Fe | N | Mg |
| --- | --- | --- | --- |
| Percent 99.82 | Percent .06 | Percent .01 | absent |

The absence of magnesium in the above sample showed that the crystals were free of excess reducing metal and by-product salt. The Brinell hardness of a sample of this material after melting in a small arc furnace was 120.

*Example III*

The apparatus of Example II was further modified to permit the reduction of vaporous titanium tetrachloride with vaporous sodium. For this adaption of the invention, the magnesium boiler was removed and replaced with a sodium vaporizing system. This system consisted of a sodium melt tank from which molten sodium was metered to a flash-vaporizer by displacing the sodium in the melt tank with a metered volume of kerosene. The apparatus was assembled, tested for vacuum tightness, and heated to reaction temperature.

After testing the hot reactor to insure that the system was still free of leakage, the temperatures were stabilized with the sodium vaporizer furnace at about 900° C., the titanium tetrachloride flash-vaporizer at about 450° C., and the reaction zone at between 850° C.–900° C. Pressure in the line between the condenser and the vacuum pump was pumped down to about 50 microns. The reaction was run for six hours. During this time sodium was supplied at the average rate of about 7.67 lbs. per hour, and titanium tetrachloride was supplied at a rate of slightly less than 16 lbs. per hour. The average production rate for the titanium product was about 4 lbs. per hour and by-product sodium chloride was produced at a rate of 19½ lbs. per hour.

During the operation, the temperature of the reaction zone was controlled at not higher than 900° C. by turning off the heating means in the furnace and allowing cooling air to enter the structure and remove some heat. At the end of the run the apparatus was cooled and opened. About 16 lbs. of crystalline titanium was found in the reaction zone as a crystal mass with a total of about 5 lbs. of spongy material adhering to the walls, the baffles, and the heat reflectors towards the rear of the reaction zone. The sodium chloride by-product salt comprised about 117 lbs. of sodium chloride with about 3 lbs. of fine titanium crystals which had blown into the condenser. A slight excess of sodium was supplied during the operation, and this was collected with the by-product salt.

A sample of the crystalline material was analyzed and found to be equivalent to that obtained in Example II. A sample of the material after melting in an arc furnace had a Brinell hardness number of 87.

*Example IV*

An apparatus as shown in FIG. 2 constructed of 316 stainless steel was set up for the preparation of niobium metal. The reactor and condenser had a combined length of 8 ft. and diameter of 10 inches, and the baffles were shaped to conform with the cylindrical chamber. Niobium pentachloride was prepared and placed in a stainless steel vaporizer connected to one of the inlets to the reactor. Magnesium was supplied through the other inlet from a boiler of the type used in Example I. The rate of flow of the Mg vapor was controlled by an orifice of 0.328 inch diameter in the vapor line, and the $NbCl_5$ by one of 0.107 diameter in the corresponding line. The apparatus was purged with argon and pumped down to about 10 microns pressure to check for leaks. When tight, the furnace for the reaction zone was turned on and the temperature was brought to about 850° C.– 900° C. Cold water was supplied to the condenser by means of a spray rather than a jacket, as shown in FIG. 2. During the heat-up of the reaction zone, there was an increase in pressure due to out-gassing of the internal surfaces and the pressure was again reduced to below 100 microns by pumping. The temperature of the Mg boiler was raised to 830° C. (ranging from 830° C. to 840° C. during the run) and the $NbCl_5$ vaporizer was raised to 210° C. (varying from 207° C. to 212° C. during the run). This set of conditions (assuming equilibrium vapor pressures as was done for Mg in Example I) theoretically supplied about a 30% excess of Mg over that required to completely reduce the halide vapor. During the run the pressure in the condenser (near the vacuum line) ranged from 1 mm. to 0.3 mm. The ends of the shafts holding the baffles were hammered periodically during the run, thus causing the niobium crystals to fall from the baffles and into hopper 33. After 2 hours and 20 minutes, the vaporizers were cooled. The reaction chamber was held an additional half hour at temperature under vacuum and then flooded with argon and cooled. About 10 pounds of niobium metal was obtained, most of it in the form of aggregates resembling feathers which had dropped into the hopper 33. A minor portion of metal adhered to the baffles with small amounts on the reactor wall and a little fine material was carried into the salt condenser. Practically all of it was of high purity. A sample of the material in the collecting chamber was disintegrated in a high-speed mixer ("Waring Blendor") in argon. The resulting powder was nearly all —60 mesh and could be pressed into sheets and bars by powder metallurgy techniques. A small portion of the product was melted to a button and found to have a Brinell hardness number of 85 indicating high purity.

The refractory metal chlorides are the preferred halides for use in this invention. However, the other halides, particularly those in which the halogen component has an atomic number greater than 9 (i.e., bromine or iodine), can also be used. The fluorides are not particularly useful herein because of the high melting point and low vapor pressure of the resulting by-product salts. The purification of the starting halide is an important preliminary step in insuring a very pure metal product. If the impurity content of the halide is substantially greater than can be tolerated in the metal product, purification means, such as treatment with hydrogen as shown in Example 1, should be resorted to.

It is preferable to use an amount of reducing metal which is at least sufficient to reduce all of the refractory metal halide to elemental metal. A slight excess of reducing metal can be tolerated in the system since this excess will be condensed and collected with the by-product metal chloride. Moreover, if the reducing metal is in excess and the temperature within the condensing zone is maintained at or below that at which the vapor pressures of both the by-product metal halide and the reducing metal equal the operating pressure, then there will be no gases to be withdrawn from the system. The tetrahalide reactant is completely consumed and the excess reducing metal and by-product salts are condensed after leaving the reaction zone. Under such conditions, the reaction system may be brought down to the proper pressure and sealed. Due to the fact that there are no by-product gases, pressure build-up in the system will be slow and the process may be operated for some time before the vacuum pump has to be cut back into the system. On the other hand, the use of an excess of refractory metal halide can cause problems. When there is excess refractory metal halide, there is the danger of forming by-product subhalides. Furthermore, since the refractory metal halides are relatively volatile, there is the problem of having a portion of the halide vapors going straight through the condensing zone and into the apparatus for creating the vacuum.

Any reducing metal having a substantial vapor pressure at the reaction temperatures employed in this invention and which is more electropositive than the metal being produced is contemplated for use. Among the examples of active reducing metals which may be employed are the alkali and alkaline earth metals such as magnesium, calcium, barium, strontium, sodium, potassium, and lithium. Of these, sodium and magnesium are preferred.

The preferred group IV and V refractory metals to be produced according to this invention are titanium, zirconium, and niobium. However, good results are obtained with any group IV or group V refractory metal. In speaking of refractory metals of groups IV and V of the periodic table, reference is made to the metals titanium, zirconium, hafnium, vanadium, niobium, and tantalum. These metals are the refractory metals of groups IV and V in all of the various arrangements of the periodic table.

Theoretically, no lower limit of practical pressure within the reactor exists. In practice, however, there will always be a pressure of a few microns of mercury. Although the actual pressure within the reaction zone may be measured and used as an operating control, one preferably uses the pressure existing at the cooler end of the by-product condenser. When by-product salt and residual unreacted materials are to be removed from the condenser as liquids, the pressure in the condenser at its operating temperature must at least be equal to the vapor pressure of the most volatile of the liquids to be removed. Moreover, in order to maintain the by-product halide in the vapor state in the reaction zone, the reaction zone temperatures must be higher than the dewpoint of the byproduct halide at operating pressure.

The reactor and condenser can be constructed of mild steel. However, since the reduction reaction is exothermic and the reaction zone will tend to reach a temperature substantially higher than the temperature of the reacting vapors, it will be found preferable when operating at temperatures in excess of about 920° C. to construct the reactor and/or liner of the metal being produced so as to avoid the possibility of contaminating the metal product.

This process has several advantages not heretofore obtained. For example, the reactants are freshly distilled just prior to reaction, thus resulting in a metal product of improved purity. Another advantage is that the invention does not require the inert gas atmosphere which is essential to certain prior art processes. Still another advantage is that the refractory metal which is produced is immediately separated from by-product salt and unreacted reactants, thus reducing contamination of the desired metal end product. Still further, the subatmospheric pressures used in this invention cause the reaction to take place at relatively low temperatures, thus avoiding many of the problems in regard to materials of construction which were prevalent in prior metal reducing operations.

Another particularly valuable result is in the useful and easily recovered form of the product metal. This is an especially important feature when producing the higher melting refractory metals. For example, niobium melts at above 2400° C. and any process requiring melting and casting of such a metal is difficult and costly. Therefore, there is an advantage in this invention since the product of the process described herein is uniquely suited for powder metallurgy techniques which are cheaper and frequently preferred. Niobium produced by this method in stainless steel apparatus has shown the following low impurity analysis:

| | Percent by weight |
|---|---|
| Mg | .01 |
| Cl | .01 |
| Fe | .02 |
| Cr | .01 |
| Ni | .002 |

This product was easily reduced to −60 mesh. Its powder metallurgical value was compared with two samples from prior processes. All samples were substantially −60 mesh and of about the same hardness. Powders were pressed at 50 tons per square inch and tensile or "green" strengths were found to be as follows:

| Process: | Green Strength, p.s.i. |
|---|---|
| 1. Hydrogen reduced Nb | 5,000 |
| 2. Electrolytic Nb | 10,000 |
| 3. Vapor phase Nb (Ex. IV) | 20,000 |

This is substantial proof that the product of this invention has unique and outstanding value in the powder metallurgy field.

Since many widely different variations of the invention can be resorted to without departing from its spirit and scope, it will be understood that the invention is not limited to the specific embodiments above set forth, except as defined in the appended claims.

This application is a continuation-in-part of copending application Serial No. 407,814, filed February 2, 1954, now abandoned, which in turn is a continuation-in-part of application Serial No. 281,027, filed April 7, 1952, now abandoned.

I claim:

1. A method for producing a high-purity refractory metal selected from the group consisting of titanium, zirconium, hafnium, vanadium, niobium, and tantalum, comprising combining within a contaminant-free bizonal metal reaction vessel a vaporous stream of a halide of said metal, the halogen component of which has an atomic number greater than 9, and a vaporous stream of a reducing metal selected from the group consisting of alkali and alkaline earth metals, passing the vaporous mixture over baffles in a tortuous path of travel for reaction in a reaction zone of said vessel maintained under a subatmospheric pressure and at temperatures ranging from 750° C.–1200° C. and above the condensation temperature of the reactants and by-product salt formed, continuing the passage of said vaporous mixture until the channels between said baffles become constricted by metal product buildup on the surfaces of said baffles to a point where the flow of said vaporous mixture is objectionably impeded, conducting the remaining reactants and by-products while in the vapor state into a communicating condensing zone of said vessel also maintained under a sub-atmospheric pressure and wherein said reactants and by-product salt condense, and removing said baffles containing the deposited refractory metal product from said reaction zone to recover said product.

2. A method for producing high-purity titanium metal comprising combining within a contaminant-free bizonal metal reaction vessel a vaporous stream of titanium tetrachloride and a vaporous stream of a reducing metal selected from the group consisting of alkali and alkaline earth metals, passing the vaporous mixture over baffles in a tortuous path of travel for reaction in a reaction zone of said vessel maintained under a subatmospheric pressure, and at temperatures ranging from 750–1200° C. and above the condensation temperature of the reactants and by-product salt formed, continuing the passage of said vaporous mixture until the channels between said baffles become constricted by metal product buildup on the surfaces of said baffles to a point where the flow of said vaporous mixture is objectionably impeded, conducting the remaining reactants and by-product while in the vapor state into a communicating condensing zone of said vessel also maintained under a subatmospheric pressure but below the condensation temperature of said by-product salt and residual reducing metal vapor present, and removing said baffles containing the titanium metal product from said reaction zone to recover said product.

3. A method for producing high-purity titanium metal comprising combining within a contaminant-free bizonal metal reaction vessel a vaporous stream of titanium tetrachloride and a vaporous stream of magnesium, passing the resulting vaporous mixture over baffles in a tortuous path of travel for reaction in a reaction zone of said vessel maintained under a subatmospheric pressure, and at a temperature ranging from 750–1200° C. and above the condensation temperature of reactants and by-product magnesium chloride formed in the reaction, continuing the passage of said vaporous mixture until the channels between said baffles become constricted by metal product buildup on the surfaces of said baffles to a point where the flow of said vaporous mixture is objectionably impeded, conducting the remaining reactants and by-product while in the vapor state into a communicating condensing zone also maintained under a subatmospheric pressure but below the condensation temperature of said magnesium chloride and residual magnesium metal vapor, and removing said baffles containing the titanium metal product from said reaction zone to recover said product.

4. A method for producing high-purity titanium metal comprising combining within a contaminant-free bizonal metal reaction vessel a vaporous stream of titanium tetrachloride and a vaporous stream of magnesium, passing the resulting vaporous mixture over baffles in a tortuous path of travel for reaction in a reaction zone of said vessel maintained under a subatmospheric pressure of between .25 and 175 mm. Hg, and at a temperature ranging from 750–1200° C. and above condensation temperature of the reactants and by-product magnesium chloride formed in the reaction, continuing the passage of said vaporous mixture until the channels between said baffles become constricted by metal product buildup on the surfaces of said baffles to a point where the flow of said vaporous mixture is objectionably impeded, conducting the remaining reactants and by-product while the vapor state into a communicating condensing zone also maintained under said subatmospheric pressure but at a temperature below the condensation temperature of said magnesium chloride and residual magnesium metal vapor, and removing said baffles containing the titanium metal product from said reaction zone to recover said product.

5. A method for producing high-purity zirconium metal comprising combining within a contaminant-free bizonal metal reaction vessel a vaporous stream of zirconium tetrachloride and a vaporous stream of magnesium, passing the resulting vaporous mixture over baffles in a tortuous path of travel for reaction in a reaction zone of said vessel maintained under a subatmospheric pressure of between .25 and 175 mm. Hg, at a temperature ranging from 750–1200° C. and above the condensation temperature of the reactants and by-product magnesium chloride formed in the reaction, continuing the passage of said vaporous mixture until the channels between said baffles become constricted by metal product buildup on the surfaces of said baffles to a point where the flow of said vaporous mixture is objectionably impeded, conducting the remaining reactants and by-product while in the vapor state into a communicating condensing zone also maintained under said subatmospheric pressure but at a temperature below the condensation temperature of said magnesium chloride and residual magnesium metal vapor, and removing said baffles containing the zirconium metal product from said reaction zone to remove said product.

6. A method for producing a high-purity refractory metal selected from the group consisting of titanium, zirconium, hafnium, vanadium, niobium, and tantalum comprising introducing a vaporous mixture of a halide of said refractory metal in which the halogen component has an atomic number greater than 9 and a reducing metal selected from the group consisting of alkali and alkaline earth metals into a reaction zone containing plate-like baffles, said reaction chamber being at subatmospheric pressure and at a temperature below the melting point of the refractory metal and above the boiling temperature of the reducing metal as well as the condensation temperature of the halide of said reducing metal at the existing pressure of said reaction zone, passing said vaporous mixture along a tortuous path created by said baffles, reducing the refractory metal halide in said vaporous mixture with the reducing metal thereby depositing refractory metal in crystalline form on the surfaces defining said tortuous path, while unconsumed reactants and by-product salts pass through said reaction zone and into a condensing zone maintained under a subatmospheric pressure and at a temperature below the condensation temperature of both by-product salt and unreacted reactants at the pressure existing in said condensing zone, condensing said by-product salts and unreacted reactants in said condensing zone and recovering the deposited refractory metal from the reaction zone.

7. The process of claim 6 in which the refractory metal halide is niobium pentachloride.

8. A method for producing a high-purity refractory metal selected from the group consisting of titanium, zirconium hafnium, vanadium, niobium, and tantalum comprising introducing a vaporous mixture of a halide of said refractory metal in which the halogen component has an atomic number greater than 9 and a reducing metal selected from the group consisting of alkali and alkaline earth metals into a reaction zone containing plate-like movable baffles, said reaction chamber being at subatmospheric pressure and at a temperature below the melting point of the refractory metal and above the boiling temperature of the reducing metal as well as the condensation temperature of the halide of said reducing metal at the existing pressure of said reaction zone, passing said vaporous mixture along a tortuous path created by said baffles, reducing the refractory metal halide in said vaporous mixture with the reducing metal thereby depositing refractory metal in crystalline form on the surfaces defining said tortuous path, while unconsumed reactants and by-product salts pass through said reaction zone and into a condensing zone maintained under a subatmospheric pressure and at a temperature below the condensation temperature of both by-product salt and unreacted reactants at the pressure existing in said condensing zone, condensing said by-product salts and unreacted reactants in said condensing zone and recovering the deposited refractory metal from the reaction zone by moving the baffles and dislodging the metal product.

9. The process of claim 8 in which the refractory metal halide is niobium pentachloride.

References Cited in the file of this patent

UNITED STATES PATENTS

| | | |
|---|---|---|
| 1,306,508 | Weintraub | June 10, 1919 |
| 2,514,275 | Allen | July 4, 1950 |
| 2,828,199 | Findlay | Mar. 25, 1958 |
| 2,870,007 | Boettcher et al. | Jan. 20, 1959 |

OTHER REFERENCES

Metal-Industry, May 16, 1947, pp. 363–364.